United States Patent [19]

Butler

[11] Patent Number: 4,553,146
[45] Date of Patent: Nov. 12, 1985

[54] REDUCED SIDE LOBE ANTENNA SYSTEM
[75] Inventor: Jesse L. Butler, Nashua, N.H.
[73] Assignee: Sanders Associates, Inc., Nashua, N.H.
[21] Appl. No.: 543,669
[22] Filed: Oct. 19, 1983
[51] Int. Cl.⁴ .......................... G01S 3/16; G01S 3/28
[52] U.S. Cl. ..................................... 343/379; 343/853
[58] Field of Search ............... 343/379, 380, 383, 853, 343/778, 777, 381, 382

[56] References Cited
U.S. PATENT DOCUMENTS

| | | | |
|---|---|---|---|
| 3,177,489 | 4/1965 | Saltzberg | 343/381 |
| 3,982,245 | 9/1976 | Soule, Jr. et al. | |
| 4,060,807 | 11/1977 | Barton | 343/17.1 R |
| 4,313,116 | 1/1982 | Powell et al. | 343/383 |

Primary Examiner—Theodore M. Blum
Attorney, Agent, or Firm—Louis Etlinger; Stanton D. Weinstein

[57] ABSTRACT

A directional antenna system having a passive arrangement for reducing the amplitude of signals received in the direction of one of the side lobes of the antenna pattern. The system includes a main directional antenna and two or more auxiliary antennas, each of which has less directivity than the main antenna. The auxiliary antennas are aimed in the direction of a selected side lobe of the main antenna whose effect is to be diminished. The outputs of all the antennas are combined in a network having appropriate amplitude and phasing adjustments to cause the combined outputs of the auxiliary antennas to interfere destructively with the energy received by the main antenna in the direction of the selected side lobe.

15 Claims, 4 Drawing Figures

REDUCED SIDE LOBE ANTENNA SYSTEM

BACKGROUND OF THE INVENTION

This invention relates to a directional antenna system having side lobe cancellation. More particularly, it relates to an antenna system comprising a main directive antenna and a set of auxiliary directive antennas, connected in a passive network which uses the overall pattern of the auxiliary antennas to cancel part of the side lobe pattern of the main antenna.

To facilitate the explanation of this invention, we shall use the term "antenna" to include directive systems such as single element radiators combined with reflectors or arrays of single element radiators.

The invention is especially applicable to point-to-point microwave communication systems. To enhance the signal levels and also to avoid interference with others using the same frequencies, highly directive antennas are usually used for both transmission and reception between the stations in each link of the system. The radiation pattern of such an antenna includes a main lobe and a number of side lobes whose magnitude in relation to the main lobe and whose angular spacing depend on the effective aperture of the antenna, i.e. essentially its diameter in wavelengths.

The side lobes can present a serious problem if a transmitting station in another communications network using the same frequency is located nearby. Specifically, if the other station is in the direction of one of the side lobes in the pattern of a receiving station, the power received from that transmitting station may cause substantial interference with signals received from the desired principal lobe direction. Similarly, energy transmitted in a side lobe direction may interfere with the operation of a station in another network.

A number of schemes have been proposed for suppression of side lobes to minimize the effective amplitudes of interfering signals received from the directions of those lobes. For example, U.S. Pat. No. 3,982,245 describes an adaptive system including an omnidirectional antenna in addition to the directive main antenna. The signals from the two antennas are combined so that they interfere with each other in such manner as to materially reduce the strengths of signals received from the direction of a side lobe, without a corresponding reduction in the energy received from the direction of the principal lobe.

The system is characterized by cancellation of side lobe energy only over a narrow range of angles and a narrow range of frequency. However, because it is adaptive, it "tracks" the interfering signal and thus diminishes its effect even though the effective direction and frequency of that signal may vary. On the other hand, an adaptive arrangement requires active circuit elements and this diminishes its reliability. This can be a problem especially in networks in which the relay stations are remotely located and long periods of unattended operation are therefore desirable. Moreover, the system cancels side lobes only in the receiving mode. It can cancel side lobes during transmission only with substantial modification and, even then, only if there is occasional reception of signals from the direction in which cancellation is desired.

OBJECTS OF THE INVENTION

A principal object of the invention is to provide a directive antenna having side lobe cancellation in which the cancellation is accomplished solely by passive circuit elements.

Another object of the invention is to provide a side lobe cancellation system in which the cancellation is effective over a substantial range of angles.

A further object is to provide a side lobe cancellation system in which the cancellation is effective over a frequency range that is broader than the range of prior side lobe adaptive cancellation systems.

Yet another object is to provide a side lobe cancellation system that is effective for both transmission and reception.

SUMMARY OF THE INVENTION

An antenna system embodying the invention includes, in addition to the main directive antenna, a pair of smaller, less directive auxiliary antennas. The main antenna is aimed at the other station in the communications link. The auxiliary antennas are aimed toward a source of interference and they are spaced apart by approximately the diameter of the main antenna. The outputs of the three antennas are summed and the resulting interference among the three signals largely cancels the side lobe in the main antenna directed toward the interference source.

Specifically, since the spacing between the auxiliary antennas corresponds to the aperture of the main antenna, summation of the outputs of the auxiliary antennas results in an interference pattern which has the same spatial frequency as the diffraction pattern giving rise to the side lobes of the main antenna. Thus, if the interference pattern is summed with the diffraction pattern of the main antenna with a proper phase relationship, it will provide destructive interference with the pattern of the main antenna over a relatively wide range of directions.

The directivity of the auxiliary antennas essentially applies an envelope to their interference pattern, thereby effectively limiting the interference pattern to the beam width of the auxiliary antennas. The interference effect of the pattern of the main beam is thus limited to a corresponding range of angles in the direction of the interference source. In particular, there is little or no effect on the principal lobe in the pattern of the main antenna.

With this arrangement, the side lobe cancellation is effective over a range of angles and furthermore it tends to track changes in frequency. Accordingly, the system can cope with variations in the effective bearing of an interference source due to changes in reflections from terrain features and man-made objects and it can also cope with variations in frequency, without the use of active circuit elements which adaptively cause the cancellation circuitry to track changes in bearing and frequency. Because it operates entirely with passive circuit elements, it is more reliable than the prior cancellation arrangements and, furthermore, it is effective for both reception and transmission.

In many locations, antenna patterns vary substantially from the ideal free-space patterns. The preferred embodiment of the system described herein includes circuit components for varying the relative phases and amplitudes of the various signals so as to adjust the circuit to the actual pattern conditions and thus maximize the desired cancellation effect.

DESCRIPTION OF THE PREFERRED EMBODIMENTS

Figure 1:
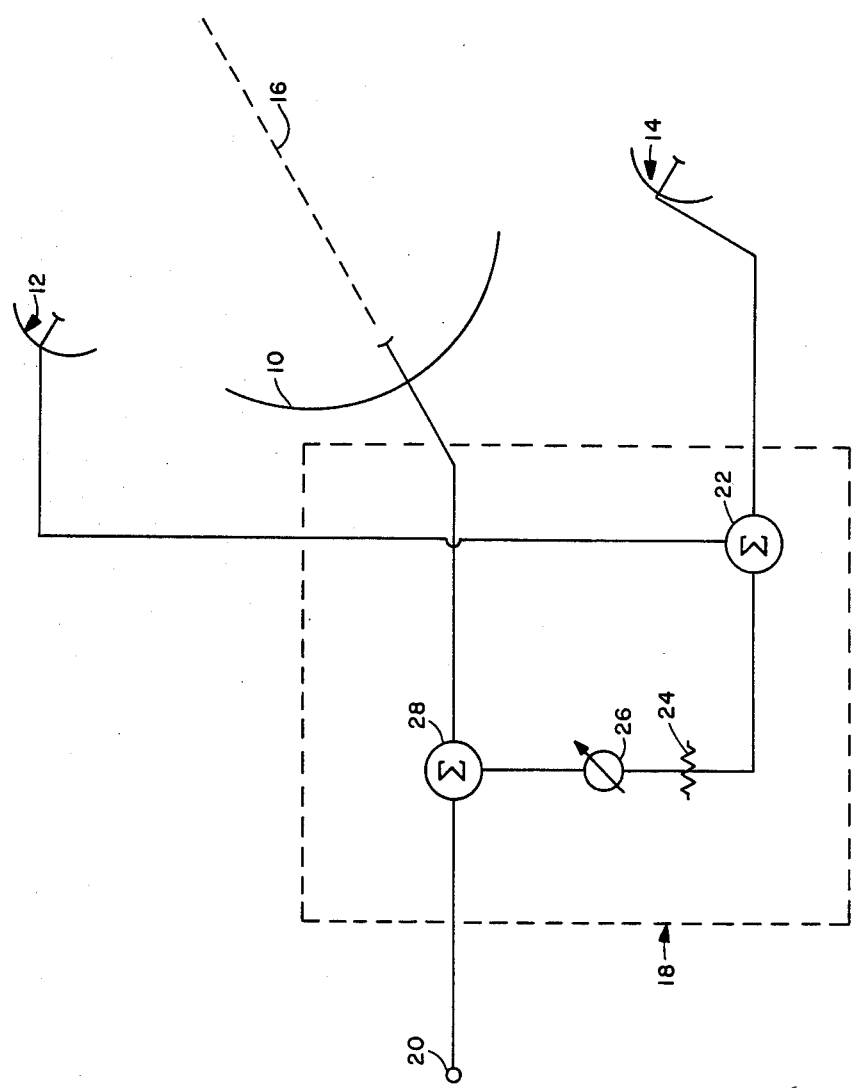
FIG. 1 is a simplified schematic diagram of a side lobe cancellation system embodying the invention.

As shown in FIG. 1, a communications station embodying the invention includes a main antenna 10 and a pair of auxiliary antennas 12 and 14. The main antenna, which has a relatively large aperture and thus is highly directive, is aimed toward another communications station (not shown) forming a link with the depicted station. Specifically, the axis 16 of the principal lobe in the radiation pattern of the antenna 10 is directed toward the other station.

The antennas 12 and 14 are also directive and they are aimed at the source (not shown) of an interfering signal. These antennas are substantially smaller and thus less expensive than the main antenna 10. The outputs of the three antennas, when used in the receiving mode, are combined in a cancellation network 18 to cancel a side lobe in the pattern of the main antenna 10 directed toward the interfering source. The output of the antenna system is provided by the network 18 at a port 20.

As further depicted in FIG. 1, the cancellation network 18 includes a summing device 22 that combines the outputs of the auxiliary antennas 12 and 14 and an attenuator 24 and phase shifter 26 for adjusting the phase and amplitude of the combined auxiliary antenna output. The resulting signal is then combined with the output of the main antenna 10 in a summing device 28, the output of the summing device 28 appearing at the output port 20.

The auxiliary antennas 12 and 14 constitute a two-element array whose pattern, i.e. variation of response with azimuthal angle, is represented in the output of the summing device 22. The summing device 28 combines this pattern with the pattern of the main antenna 10 and the resulting interference between the two patterns materially diminishes the side lobe in the pattern of the main antenna in the direction of the interference source. It thus substantially reduces the amplitude of the interfering signal at the output port 20.

Figure 2:
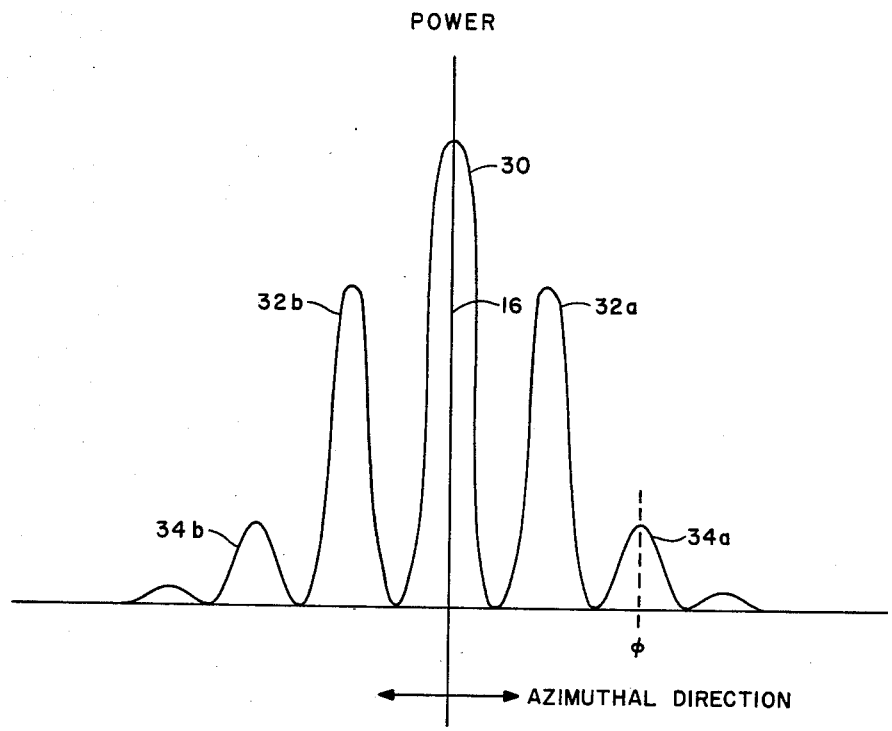
FIG. 2 is a graph of an idealized pattern of the main antenna in the system of FIG. 1.

FIG. 2 depicts the idealized, i.e. free space, pattern of the antenna 10. Specifically it graphically depicts the relative power received by the antenna at various angles relative to the principal axis 16 of the antenna. This is a conventional diffraction pattern with a principal lobe 30 centered on the axis 16 and a series of side lobes, of which lobes 32A, 32B, 34A and 34B are depicted.

Figure 3:
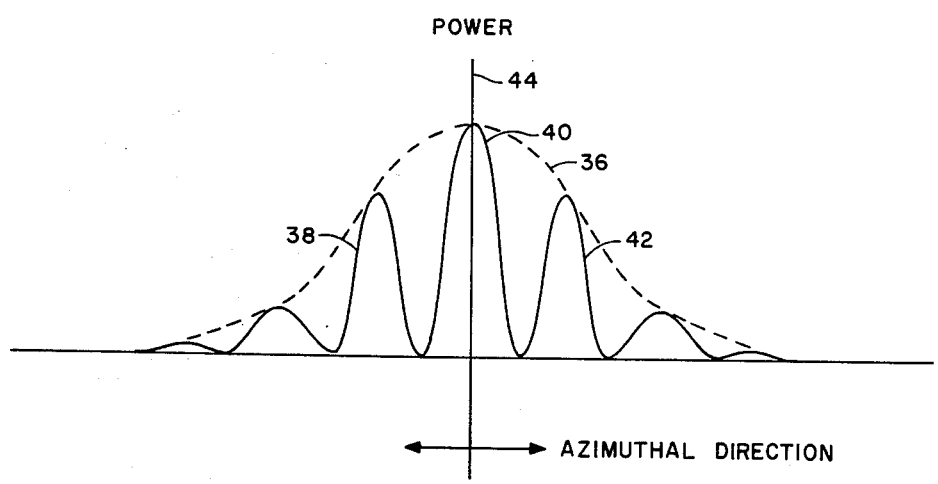
FIG. 3 is an idealized pattern of the combined outputs of the auxiliary antennas of FIG. 1.

FIG. 3 depicts the combined pattern of the auxiliary antennas 12 and 14. If these were omnidirectional antennas, their combined output would be an interference pattern having a series of equal-height maxima spaced by equi-angular increments. The directivity of the antennas 12 and 14 applies to this interference pattern the diffraction pattern of the individual antennas and, specifically, the diffraction pattern provides an envelope for the interference pattern. In FIG. 3 the pricipal lobe 36 of this envelope contains within it the maxima 38, 40 and 42 of the interference pattern of the two auxiliary antennas. The side lobes of the diffraction pattern of the antennas 12 and 14 have substantially lower amplitudes than the main lobe 36 and therefore the effect of those lobes can be neglected in the description of this invention.

The main lobe 36 and the interference pattern maximum 40 in FIG. 3 are centered on an axis 44 in the direction of the source of interference. The combined output of the antennas 12 and 14 is thus limited to several interference maxima centered on the direction of the interference source.

For the purposes of this discussion, we shall assume that the interference comes from the direction Φ of the side lobe 34A (FIG. 2) of the main antenna 10. The network 18 of FIG. 1 causes the maximum 40 and adjacent portions of the pattern in FIG. 3 to destructively interfere with the side lobe 34A, thereby largely cancelling the latter side lobe and thus materially reducing the effect of signals from the interfering source on the output signal at the port 20 (FIG. 1). Furthermore, modulation of the interference pattern of the antennas 12 and 14 by the diffraction pattern of the individual antennas, as depicted in FIG. 3, limits the interfering effect to a range of angles around the axis 44 of the auxiliary antennas and thus largely prevents the outputs of the auxiliary antennas from affecting the response of the antenna 10 in the direction of the axis 16. Also, the directivity of the antennas 12 and 14 is such as to insure that the maximum 40 is at least as large in amplitude as the side lobe 34A in the pattern of the antenna 10. Thus the cancellation network 18 need not reduce the signal received by the antenna 10 nor amplify the combined signal from the antennas 12 and 14 in order to provide the desired cancellation.

Figure 4:
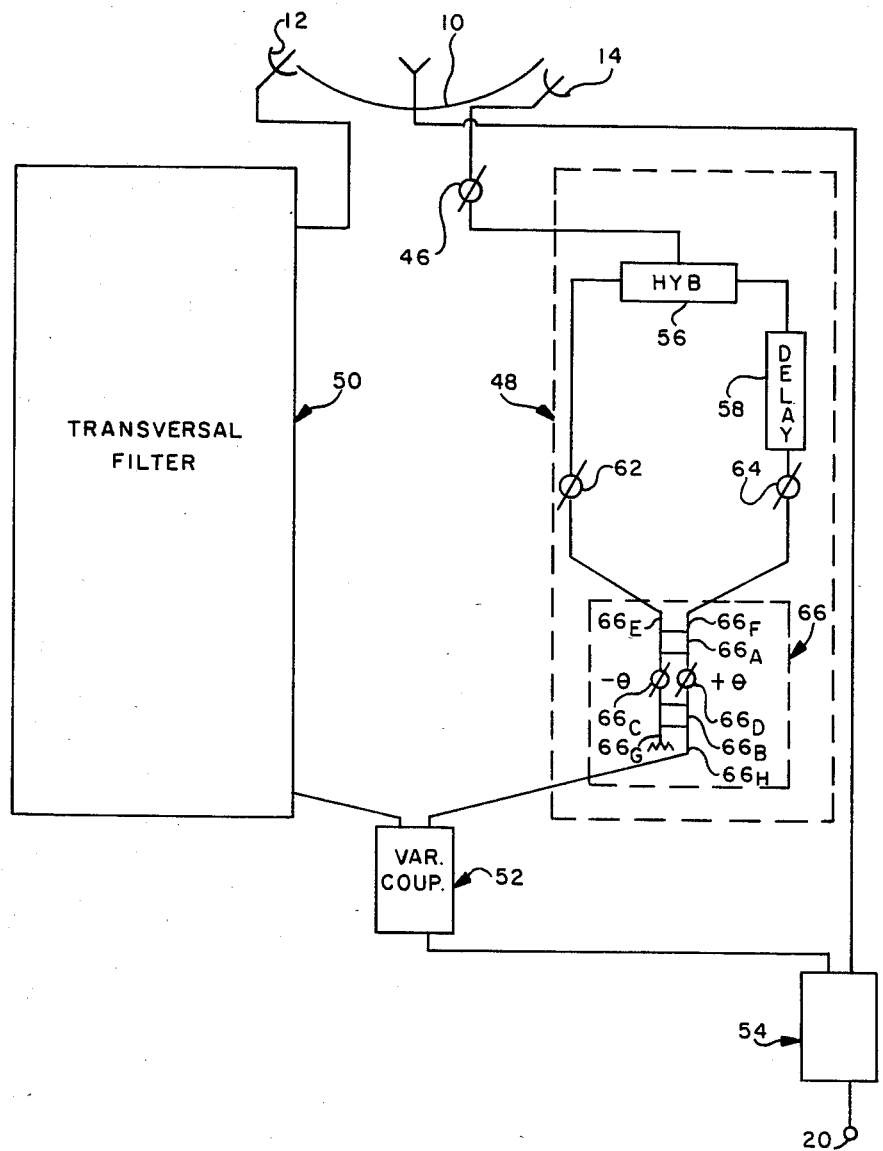
FIG. 4 is a schematic diagram of a network used for combining the patterns of the individual antennas in the system.

FIG. 4 depicts the preferred form of the cancellation network 18 of FIG. 1. The network will be described in terms of signal reception, it being understood that it is reciprocal and thus provides the same side lobe characteristics during transmission, when the output of a transmitter is applied to the port 20. The signals from the auxiliary antennas 12 and 14 are applied to a pair of transversal filters 48 and 50, the signal from the antenna 14 passing first through a variable phase shifter 46. The phase shifter 46, by adjusting the relative phases of the signals from the two auxiliary antennas, provides a mechanism for electrically steering the spatial pattern of the array comprising these antennas.

The outputs of the filters 48 and 50 are combined in a variable coupler 52 which serves to adjust the relative contributions of the two filters in the output of the coupler. The output of the coupler 52 is then combined, in a variable coupler 54, with the output of the main antenna 10 to provide the side lobe cancelled signal at the output port 20.

More specifically, the transversal filter 48, which has the same construction as the filter 50, has an input hybrid coupler 56 which divides the signal from the coupler 44 between a delay line 58 and a variable phase shifter 62. The output of the delay line 58 is passed through a variable phase shifter 64. The outputs of the phase shifters in turn are applied to a variable coupler 66 whose output is applied to the variable coupler 52.

The delay line 58 applies to the signal passing through it a phase delay that is linearly related to frequency. This signal and the undelayed signal from the coupler 56 receive further phase adjustments in the phase shifters 62 and 64, whose phase shifts are essentially independent of frequency over the relatively small range of frequencies involved. The two resulting signals are combined in the variable coupler 66, which varies their relative weight in the output of the transversal filter 48.

The filter 48 thus provides means for adjusting the phase of the output of the antenna 12 relative to that of the main antenna 10 for ultimate cancellation in the coupler 54 and it also provides means for adjusting the variation in the output of the antenna 12 with frequency to correspond with the frequency-dependent changes in that part of the output of the antenna 10 resulting from reception in the side lobe of that antenna which is to be cancelled, i.e. the side lobe 34a of FIG. 2.

The variable coupler 66, which has the same construction as the variable couplers 52 and 54, includes a hybrid 66a and a second hybrid 66b, connected to receive signals from the hybrid 66a by way of a pair of gauged variable phase shifters 66c and 66d. Ports 66e and 66f receive the signals from the phase shifters 62 and 64. A port 66g is terminated with an appropriate resistance and a port 66h provides the output that is applied to the coupler 52. Variation in coupling is provided by adjustment of the phase shifters 66c and 66d.

The coupler 52 is used to adjust the relative contributions of the two antennas 12 and 14 to the cancellation signal and the coupler 54, in turn, is used to adjust the amplitude of the cancellation signal relative to the signal from the main antenna 10, so as to provide equality of the two amplitudes and thus cancellation of that part of the signal from the antenna 10 that is received from the direction of the side lobe 34A (FIG. 2).

Thus the side lobe cancellation system described herein is effective over a range of azimuthal angles and over a substantial range of frequencies. It therefore does not require the inclusion of active circuit elements such as those used in adaptive cancellation networks. Furthermore, the system is reciprocal and thus provides cancellation during transmission as well as during reception.

One may make a number of variations in the system without departing from the scope of the invention. For example, the auxiliary array may include more than two antennas. Moreover, the auxiliary antennas may be arrayed in more than one direction, e.g., both the horizontal and vertical directions, so as to track the main antenna side lobes more accurately. Further, the cancellation network 18 is but one possible network configuration that can be used. In particular, to the extent that the radiation conditions approach free space conditions, the complexity of the network can be reduced.

What is claimed as new and desired to be secured by Letters Patent of the United States is:

1. An antenna system comprising:
   A. a first directional antenna;
   B. an array of auxiliary antennas, said array being directed in the direction of a single side lobe of the pattern of said first antenna; and
   C. a network for combining the signal of said first antenna with the signals of said array so as to reduce energy transmitted or received by said first antenna in the direction of said side lobe.

2. The antenna system defined in claim 1 in which said array ha substantially the same aperture as the aperture of said first antenna, whereby the interference pattern of said array has substantially the same spatial frequency as the diffraction pattern of the first antenna.

3. The antenna system defined in claim 1 in which said array includes a pair of directional auxiliary antennas, each of said auxiliary antennas having less directivity than said first antenna.

4. The antenna system defined in claim 3 in which said auxiliary antennas are spaced apart by substantially the aperture of said first antenna.

5. The antenna system defined in claim 4 in which said network contains only reciprocal, passive elements and thus provides for side lobe cancellation during transmission as well as reception.

6. The antenna system defined in claim 1 in which said network includes means for adjusting the relative amplitudes of the signals received by said first antenna and said array and means for combining the amplitude-adjusted signals to provide the output of said antenna system during signal reception.

7. The antenna system defined in claim 6 in which said network further includes means for adjusting the relative phases of antennas in said array, thereby to electrically steer the pattern of said array.

8. The antenna system described in claim 1 in which said network further includes a transversal filter or other means of adjusting and matching the temporal frequency and spatial frequency responses of the said array of auxiliary antennas to the temporal and spatial frequency responses of the said first antenna.

9. An antenna system as defined in claim 1 in which said network includes a summer for combining the signals of said auxiliary antennas.

10. An antenna system, comprising:
    a directional antenna;
    a plurality of antennas whose axes are substantially parallel to each other in a direction other than the main beam direction of said directional antenna; and
    means connected to said directional antenna and to said plurality of antennas for reducing the effect of a single side lobe of said directional antenna.

11. An antenna system as defined in claim 10 wherein the separation between adjacent antennas of said plurality of antennas is substantially the diameter of said directional antenna.

12. An antenna system as defined in claim 10 wherein the separation between adjacent antennas of said plurality of antennas is substantially the aperture width of said directional antenna.

13. Apparatus for reduction of the effect of a side lobe, comprising:
    a directional antenna;
    a plurality of antennas wherein the axis of the principal lobe of each antenna of said plurality is directed substantially in the direction of a side lobe of said directional antenna; and
    means connected to said directional antenna and to said plurality of antennas for reducing the effect of a single side lobe of said directional antenna.

14. An antenna system as defined in claim 13 wherein the separation between adjacent antennas of said plurality of antennas is substantially the diameter of said directional antenna.

15. An antenna system as defined in claim 13 wherein the separation between adjacent antennas of said plurality of antennas is substantially the aperture of said directional antenna.

* * * * *